United States Patent [19]

Kloppe

[11] Patent Number: 4,725,812

[45] Date of Patent: Feb. 16, 1988

[54] CIRCUIT ARRANGEMENT FOR IDENTIFYING SPECIFIC BIT PATTERNS, PARTICULARLY BIT PATTERNS FORMING SYNCHRONIZATION SIGNALS AND CHECK LOOP SIGNALS AND APPEARING AS SERIAL BINARY SIGNALS

[75] Inventor: Karl Kloppe, Munich, Fed. Rep. of Germany

[73] Assignee: Siemens Aktiengesellschaft, Berlin and Munich, Fed. Rep. of Germany

[21] Appl. No.: 741,172

[22] Filed: Jun. 4, 1985

[30] Foreign Application Priority Data

Jun. 4, 1984 [DE] Fed. Rep. of Germany ....... 3420768

[51] Int. Cl.$^4$ .............................................. G06F 7/20
[52] U.S. Cl. .................................. 340/146.2; 364/715
[58] Field of Search ...................... 340/146.2; 364/728, 364/715

[56] References Cited

U.S. PATENT DOCUMENTS

| | | | |
|---|---|---|---|
| 3,881,101 | 4/1975 | Pederson et al. | 364/728 |
| 4,053,871 | 10/1977 | Vidalin et al. | 364/900 |
| 4,151,511 | 4/1979 | Breikss | 340/146.2 |
| 4,227,175 | 10/1980 | Newman | 340/146.2 |
| 4,312,074 | 1/1982 | Pautler et al. | 364/728 X |
| 4,524,427 | 6/1985 | Vidalin et al. | 340/146.2 |
| 4,575,864 | 3/1986 | Rice, Jr. et al. | 364/728 |

FOREIGN PATENT DOCUMENTS

3103574 8/1982 Fed. Rep. of Germany.

*Primary Examiner*—Gary V. Harkcom
*Assistant Examiner*—Tan V. Mai
*Attorney, Agent, or Firm*—Hill, Van Santen, Steadman & Simpson

[57] ABSTRACT

A register serves for the serial acceptance of binary signals for identifying specific bit patterns in the binary signals appearing serially on a plurality of signal lines. A microprocessor, acting as a comparator, compares a respective, prescribed plurality of bits of the received binary signals to at least one prescribed bit combination. Given identification of coincidence between the respective bit combination and the bits of the received binary signals acquired in the prescribed plurality, the microprocessor emits a setting signal to a counter which counts the plurality of bits received by the register arrangement and which, when a specific count is reached, controls the transfer of the register content into a signal transfer circuit from which the register content can be accepted by a processing device.

5 Claims, 1 Drawing Figure

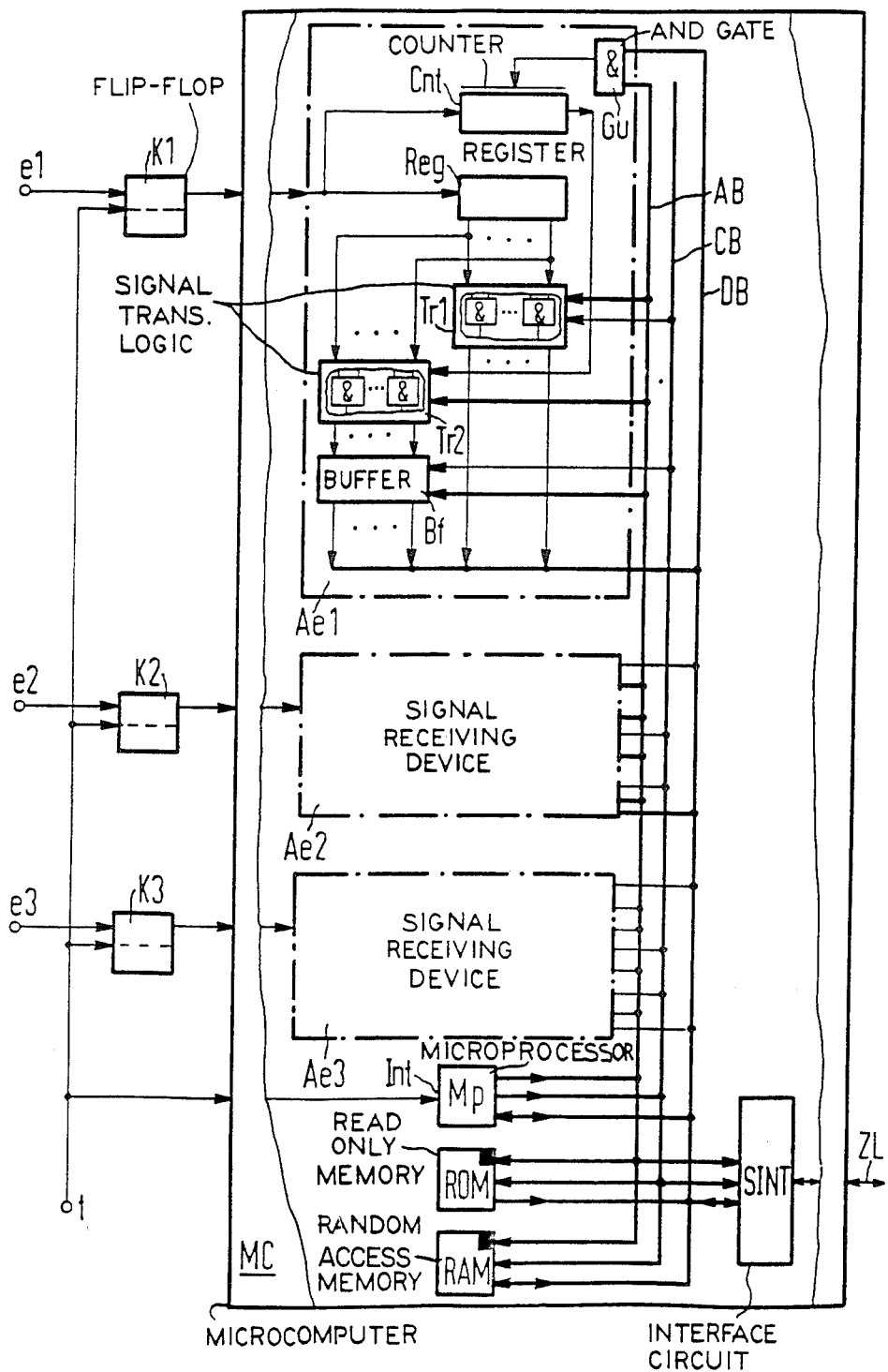

CIRCUIT ARRANGEMENT FOR IDENTIFYING SPECIFIC BIT PATTERNS, PARTICULARLY BIT PATTERNS FORMING SYNCHRONIZATION SIGNALS AND CHECK LOOP SIGNALS AND APPEARING AS SERIAL BINARY SIGNALS

CROSS REFERENCE TO RELATED APPLICATIONS

This application is related to an application Ser. No. 740,977 filed June 4, 1985, now U.S. Pat. No. 4,691,297 and an application Ser. No. 740,976 filed June 4, 1985, now U.S. Pat. No. 4,695,974.

BACKGROUND OF THE INVENTION

1. Field of the Invention

The present invention relates to a circuit arrangement for identifying specific bit patterns, particularly bit patterns forming synchronization signals and check loop signals, in binary signals appearing serially on a plurality of signal lines, comprising a register arrangement for serial receiving of the binary signals and a comparator arrangement which respectively compares the prescribed plurality of bits of the received binary signals to at least one predetermined bit combination and which, given identification of a coincidence between the respective bit combination and the bits of the received binary signals acquired in the prescribed plurality, transmits a status signal indicating a specific bit pattern.

2. Description of the Prior Art

A circuit arrangement is already known (German Pat. No. 31 03 574, fully incorporated herein by this reference) with whose assistance the synchronism between the envelope clock pulses derived from locally generated bit clock pulses and the synchronization bits of a prescribed polarity sequence regularly contained at a prescribed bit location in envelopes of a binary coded signal is produced and maintained. For this purpose, the appertaining known circuit arrangement comprises a shift register to which the individual, serially appearing binary signals are supplied. A circuit arrangement which respectively actively connects only the output of one shift register stage to the input of a comparator arrangement is connected to the outputs of the individual shift register stages. This comparator arrangement compares the respective bits supplied thereto via a switch arrangement to a bit of a prescribed bit sequence. Given lack of coincidence of the bits compared to one another in the comparator arrangement in such a manner, the comparator arrangement emits a setting signal to the switch arrangement whose setting is modified in response thereto. Only given identification of a coincidence of the bits compared to one another does the comparator arrangement emit a status signal which, on the one hand, indicates the identification of a specific bit pattern and which, on the other hand, leads to the disablement of the switch arrangement. Although it is possible with the assistance of this known circuit arrangement to identify specific bit patterns in a serially appearing binary signal, it is not possible without further measures to identify such bit patterns which are composed of immediately successive bits. Further, it is not possible without further measures, given the known circuit arrangement, to check binary signals appearing serially on a plurality of signal lines with respect to the existence of specific bit patterns.

SUMMARY OF THE INVENTION

The object of the present invention, accordingly, is to provide a circuit arrangement of the type initially mentioned in which specific bit patterns can be identified with relatively low circuit expense, in binary signals appearing serially on a plurality of signal lines, whereby the bits of these bit patterns immediately following one another in the appertaining binary signals.

Given a circuit arrangement of the type initially cited, the above object is achieved, according to the present invention, in that the register arrangement has register or memory regions of the microprocessor or microcomputer which are individually assigned to the individual signal lines. Each register or memory region is connected at its input to the output of a clock-controlled flip-flop connected in the appertaining signal line and is connected at its output to a signal receiving circuit. Each signal receiving circuit, proceeding from the microprocessor or microcomputer in accordance with the clock pulses effecting the clock control of the flip-flops, transmits the contents of its register or memory region to the microprocessor or microcomputer in which the content is compared to the respectively prescribed bit combination. Given identification of a coincidence of the bits of the respective bit combination by the microprocessor or microcomputer, a setting signal is transmitted to a counter whose counter reading is variable by the bits supplied to the register arrangement, the counter being subsequently brought into a defined counter reading. The counter belonging to the respective signal receiving circuit, when reaching a prescribed count, then emits an output signal with whose assistance the transfer of the bits contained in the register or memory region of the signal receiving circuit is controlled into a processing device.

The present invention offers the advantage that one can make due with a circuit expense which is particularly low overall in order to be able to check binary signals appearing serially on a plurality of signal lines as to the presence of specific bit patterns whose bits can follow immediately upon one another. The existence of at least one specific bit pattern (for example, check loop) can thereby occur constantly and the existence of at least one further, specific bit pattern (synchronization signal) can occur dependent on the appearance of a separate job signal.

Advantageously, the flip-flops connected in the individual signal lines are all clock controlled in common by clock pulses forming a single clock signal.

The advantage of a particularly low circuit expense thereby derives for the individual flip-flops with respect to the transfer and evaluation of the individual bits into registers or memory regions individually assigned to the signal lines.

The respective signal receiving circuit preferably comprises separate signal transmission circuits, one of which is controllable by control signals proceeding from the microprocessor or microcomputer and the other of which is controllable by control signals proceeding from the appertaining counter. The advantage with respect to the transfer of the bits contained in the individual registers or memory regions is achieved with this circuit measure that one can simply distinguish with respect to the use of these bits, i.e. whether a specific bit pattern is to be identified in the bits or whether the bits are to be forwarded to the processing device for the purpose of further processing.

BRIEF DESCRIPTION OF THE DRAWING

Other objects, features and advantages of the invention, its organization, construction and operation will be best understood from the following detailed description, taken in conjunction with the accompanying drawing, on which there is a single FIGURE showing a schematic representation of a circuit arrangement constructed in accordance with the invention.

DESCRIPTION OF THE PREFERRED EMBODIMENTS

Referring to the drawing, a circuit arrangement is illustrated which comprises a plurality of signal lines, namely three signal lines e1, e2, e3 in the present case. The individual bits of binary signals are respectively serially transmitted with one and the same frequency over all signal lines which can carry data signals in accordance with the CCITT recommendation X.21. The individual binary signals can thereby, however, appear with different phase positions. In the present case, the signal lines e1–c3 have signal receiving devices formed by individual flip-flops individually assigned thereto. The flip-flop K1 belongs to the signal line e1; the flip-flop K2 belongs to the signal line e2; and the flip-flop K3 belongs to the signal line e3. These flip-flops are clock-controlled trigger circuits which have their clock inputs connected in common to a clock terminal t and whose signal inputs are connected to the respective signal lines e1, e2, e3.

Individual signal receiving devices Ae1, Ae2 and Ae3 belong to the individual flip-flops K1, K2, K3 or respectively to the signal lines e1, e2 or e3 connected thereto, these signal receiving devices forming part of a microcomputer MC in the present case. All of the signal receiving devices are identically constructed, for which reason only the structure of the signal receiving device Ae1 is illustrated in detail.

The signal receiving device Ae1 comprises a register Reg whose input is connected to the signal output of the flip-flop K1. Also, connected to the signal output of the flip-flop K1 is the counting input of a counter Cnt whose count is incremented or deincremented by each bit emitted by the signal output of the flip-flop K1. This means that the counter Cnt continues to count in the rhythm of the clock pulses which are supplied to the clock inputs of the flip-flops. It is possible in this context that the clock pulses or pulses derived therefrom and stepped down in clock rate are directly supplied to the counting input of the counter Cnt.

A signal transfer circuit which, in the present case, is composed of two separate signal transmission circuits, is connected to the output, i.e. to the parallel outputs of the register Reg, this having such a capacity that it is capable of at least accepting the bits belonging to a bit pattern to be sought. The one signal transmission circuit only comprises a signal transmission logic circuit arrangement Tr1 and the other signal transmission circuit comprises a signal transmission logic circuit arrangement Tr2 followed by a buffer Bf. The two transmission logic arrangements Tr1, Tr2 can respectively comprise a plurality of AND gates which corresponds to the plurality of register stages of the register Reg, with an input of each AND gate being connected to a respective output of the register stages and respective other inputs being connected to control lines. With respect to the buffer Bf, it should be pointed out here that the same will comprise a plurality of buffer stages corresponding to the plurality of AND gates of the signal transmission logic circuit arrangement Tr2, in order to accept the bits supplied thereto in parallel and to transmit the same in parallel at its parallel outputs. The parallel outputs of the buffer Bf are connected to corresponding outputs of the signal transmission logic circuit register Tr1 at corresponding data lines of a data bus line DB which belongs to the bus line system of the microcomputer MC.

In addition to the data bus line DB, a control bus line CB and an address bus line AB are also included in the bus line system. Each of these three bus lines AB, CB, DB comprises a plurality of individual lines, for example eight individual lines each. Control inputs of the signal transmission logic circuit arrangement Tr1 and of the buffer Bf are connected to at least some of the individual lines of the control bus line CB. Address inputs of the signal transmission logic circuit arrangements Tr1, Tr2 and the buffer Bf are connected to at least some of the individual lines of the address bus line AB. These circuit elements can therefore be identified with corresponding addresses and therefore be selected. For their activation, however, control signals are also required, these not proceeding from the address bus line AB in the case of the signal transmission logic circuit arrangement Tr2 but, in the present case, being emitted by an output of the counter Cnt. This shall be discussed in greater detail below.

Regarding the just-mentioned counter Cnt, it should also be pointed out that this has a reset input connected to the output of an AND gate Gu connected to at least some of the individual lines of the address bus line AB and some of the individual lines of the data bus line DB. However, it is also possible to connect the input of the AND gate GU to at least some of the individual lines of the address bus line AB and individual lines of the control bus line CB.

Also connected to the bus line system which comprises the address bus line AB, the control bus line CB and the data bus line DB is a microprocessor system to which a microprocessor Mp, a program memory ROM and a data memory RAM belong. These elements, as indicated in the lower portion of the drawing, are connected at their inputs and their outputs to all bus lines of the bus line system. The microprocessor Mp is also connected with an interrupt control input Int to the clock terminal t already discussed. As a result thereof, the microprocessor is controlled in the rhythm of the clock pulses appearing at the input t, as shall become clear from the discussion below.

An interface circuit SINT has its input and output connected to the bus line system. This interface circuit which, for example, can also be a universal synchronously or asynchronously operating receiving and transmitting module, also known as an USART module, has a series output connected to a two-wire line ZL by way of which binary signals are either output or received by the interface module and, therefore, by the microcomputer MC.

With the structure of the circuit arrangement shown on the drawing having been set forth above, the manner of operation of the circuit arrangement will now be considered. To this end, reference shall be made to the signal receiving device Ae1. Further, it should be pointed out at this time that, in the present case, a specific bit pattern in the binary signal appearing on the signal line e1 is to be identified with the arrangement.

The bits appearing on the signal line e1 and output by the clock-controlled flip-flop K1 proceed serially into the register Reg. They also effect the continued counting of the counter Cnt may be may be assumed to be situated at some arbitrary count. With every transfer of a bit into the register Reg, the content thereof is emitted to the data bus line DB via the signal transmission logic circuit arrangement Tr1 which has been activated by the microprocessor Mp in accordance with the clock of the clock pulses appearing at the terminal t. These bits are therefore transmitted towards the microprocessor Mp which accepts the bits and compares the same to at least one prescribed bit combination. The respective, prescribed bit combination can thereby be stored, for example, in the memory ROM which, as a read-only memory, normally only stores the program data. However, it is also possible to keep the bit combinations stored in the memory RAM designed as a write/read memory and to fetch the bit combinations with the microprocessor Mp for the purpose of the comparison to be executed. When the microprocessor Mp identifies a coincidence of the bits just accepted by the register Reg with one of the prescribed bit combinations, then the microprocessor Mp emits an address for addressing the AND gate Gu via the address bit line AB and emits a further address via the data bus line DB, whereupon the AND gate Gu may be operated into its transmissive condition and emits a binary signal '1' at its output. In the present case, the binary signal '1' leads to setting the counter Cnt to a defined count, for example to its initial count. From this point on, the control signal appearing at the output of the counter Cnt when a specific counter reading, for example eight, is reached, i.e. corresponding to the plurality of bits forming a character, is employed in order to control the signal transmission logic circuit arrangement Tr2 into its transmissive condition. In the present case, this occurs in conjunction with an address appearing on the address bus line AB. However, it should be pointed out that one can also make due without this address signal in order to conduct the content of the register Reg to the buffer Bf. The buffer Bf only accepts the bits supplied to its input when it is supplied with corresponding signals from the address bus line AB and the control bus line DB. The signals output by the buffer Bf proceed onto the data bus line DB and are supplied to the microprocessor arrangement, particularly to the microprocessor Mp, which, as a processing device, accepts the signals and, under given conditions, emits the same to the interface circuit SINT for forwarding. However, it is also conceivable to conduct the signals from the buffer Bf immediately to the interface circuit SINT by way of the data bus line DB, namely, by means of a command control of the microprocessor Mp.

As a result of the circuit arrangement described above, it is not only binary signals appearing serially on one signal line which can be checked with respect to the presence of at least one specific bit pattern but, rather, the described circuit arrangement can identify specific bit patterns in binary signals appearing serially on a plurality of signal lines. The signal receiving devices Ae1, Ae2 and Ae3 belonging to the individual signal lines in the illustrated microcomputer MC are thereby successively selected by the microprocessor Mp of the microcomputer MC in order to fetch the bits contained in the receiving registers for execution of comparison operations. The mentioned specific bit patterns can, in particular, be a matter of such bit patterns which form synchronization signals which are known as sync characters in conjunction with the transmission data signals. One thereby proceeds such that the data transmission to a desired data receiver is not initiated until after the identification of at least one such syn character per signal line. In this context, therefore, it is possible without further measures to monitor the appearance of specific bit patterns, such as the sync character, repeatedly in succession before a data transmission is initiated. Moreover, it is also possible without further measures to monitor the existence of at least one check loop signal with priority, by way of which a check loop in the arrangement under consideration is activated from one of the existing signal lines to a signal output line (not illustrated).

It should also be pointed out, in view of the clock pulses supplied to the clock terminal t, that such clock pulses appear with a clock rate which is a whole multiple of the clock rates with which the signal bits appear on the signal lines e1, e2 and e3. In this case, the counter Cnt and the register Reg of the signal receiving devices Ae1, Ae2 and Ae3 belonging to the respective signal line e1, e2 and e3 are only operated with the rate which corresponds to the clock rate with which the signal bits appear on the assigned signal line e1, e2 and e3.

In conclusion, it should also be pointed out that the signal receiving devices are shown on the drawing as being constructed of discrete units. It should be readily apparent, however, that the devices forming the individual signal receiving devices can be portions of the microprocessor mp. In this case, the microprocessor Mp would be connected to the signal outputs of the existing flip-flops K1, K2 and K3 with various terminals or, respectively, so-called ports.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A circuit arrangement for identifying specific bit patterns, including synchronization signals and check loop signals, in binary signals appearing serially on a plurality of signal lines, comprising:

a plurality of clock-controlled flip-flops each connected to a respective signal line;

a plurality of signal receiving circuits each connected to a respective flip-flop and each comprising first memory means connected to the respective flip-flop, a counter including a counting input connected to the respective flip-flop and a setting input and an output, first and second signal transfer circuits connected to said first memory means for receiving the bits clocked in via said flip-flop, a buffer connected to said second signal transfer circuit, and a gate including an output connected to said setting input and a plurality of address inputs;

a bus system; and comparison means for comparing received bit patterns with at least one predetermined bit pattern, said comparison means comprising second memory means connected to said bus system and storing said at least one predetermined bit pattern and a clock-controlled microprocessor connected to said bus system and operated to selectively address a signal line by addressing the respective gate of the respective signal receiving circuit and set the respective counter, said first and second signal transfer circuits and said buffer connected to said bus system and addressed and controlled by said microprocessor for bit pattern transfer, and said output of said counter connected to said second signal transfer circuit to enable bit pattern transfer to said buffer when said counter reaches a predetermined count.

2. The circuit arrangement of claim 1, wherein:

each of said flip-flops and said microprocessor includes a clock input, said clock inputs connected in common for synchronous operation of said circuit arrangement.

3. The circuit arrangement of claim 1, wherein:

said bus system comprises an address bus connected to each of said gates, each of said signal transfer circuits, said microprocessor and said second memory means, a control bus connected to each of said first signal transfer circuits, to said buffer, to said microprocessor and to said second memory means, and a data bus connected to said gates, to said first signal transfer circuits, to said buffers, to said microprocessor and to said second memory means.

4. The circuit arrangement of claim 1, wherein: said second memory means comprises a read only memory.

5. The circuit arrangement of claim 1, wherein: said second memory means comprises a random access memory.

* * * * *